US006457075B1

(12) United States Patent
Koutsoures

(10) Patent No.: US 6,457,075 B1
(45) Date of Patent: Sep. 24, 2002

(54) SYNCHRONOUS MEMORY SYSTEM WITH AUTOMATIC BURST MODE SWITCHING AS A FUNCTION OF THE SELECTED BUS MASTER

(75) Inventor: Dennis Koutsoures, Northlake, IL (US)

(73) Assignee: Koninkijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/313,244

(22) Filed: May 17, 1999

(51) Int. Cl.[7] .............................................. G06F 13/28
(52) U.S. Cl. ........................................ 710/35; 711/217
(58) Field of Search .............................. 710/53, 35, 60, 710/65, 66; 711/150, 151, 217

(56) References Cited

U.S. PATENT DOCUMENTS

| | | | | |
|---|---|---|---|---|
| 4,449,182 A | * | 5/1984 | Rubinson et al. | 710/60 |
| 5,134,699 A | * | 7/1992 | Aria et al. | 710/35 |
| 5,802,597 A | | 9/1998 | Nelsen | 711/169 |
| 6,065,102 A | * | 5/2000 | Peters et al. | 710/107 |
| 6,125,421 A | * | 9/2000 | Roy | 711/149 |

* cited by examiner

Primary Examiner—Matthew Kim
Assistant Examiner—Christian P. Chace
(74) Attorney, Agent, or Firm—Peter Zawilski

(57) ABSTRACT

A computer system with a multi-master system bus includes a memory controller that changes the burst mode of the including memory system automatically as a function of the selected master. The controller includes a programmable look-up table into which is stored a value B corresponding to a fixed memory burst mode; for each master, a multiplier is stored indicating the multiple of the burst mode that would be optimal for that master. The grant signal used to select the current master is also used to select the multiplier M associated with that master. In response to a read request by the current master, a requested address is forwarded to the memory. Then the controller generates and transmits M−1 addresses spaced B addresses apart every Bth bus cycle. This implements a memory system burst of M*B addresses with no latencies between successive B-address memory bursts. The memory system burst can be aborted if an address in the burst is not confirmed by a subsequent address request by the master. This approach improves the performance of a multi-master system by avoiding latencies normally involved in changing burst modes when a switch is made between masters having different burst mode requirements. The approach is preferable to utilizing long bursts that must be aborted frequently. Typically, when a write operation follows a burst, the burst is terminated upon completion—avoiding latencies involved in clearing an aborted burst before a write operation can be executed.

14 Claims, 3 Drawing Sheets

SYNCHRONOUS MEMORY SYSTEM WITH AUTOMATIC BURST MODE SWITCHING AS A FUNCTION OF THE SELECTED BUS MASTER

BACKGROUND OF THE INVENTION

The present invention relates to computer systems and, more particularly, to memory controllers for computer systems. A major objective of the invention is to enhance overall performance of multi-master computer systems by avoiding some latencies incurred due to differences in optimal burst lengths among masters.

Much of modern progress is associated with advances in computer technology that have provided increasing speed and functionality. These advances have occurred both on the level of individual integrated circuits and on the systems integration level. Integrated circuits have become faster and have accommodated more functions per circuit. Systems have provided for increasing parallelism in the utilization of integrated circuits, as well as more efficient communication among integrated circuits.

A basic computer system includes a data processor for manipulating data in accordance with program instructions; both the data and the instructions can be stored in a memory system. There can be several levels of memory. Main memory is typically some form of random access memory (RAM) residing on a different integrated circuit than the processor resides. Typically, a computer has one or more bulk storage memories—usual disk-based serial access memories such as floppy disks, hard disks, CD-ROMs, etc. The capacity of the bulk storage devices typically exceeds that of main memory, but the access times are much slower. Thus, when a program is to be executed, the required instructions and the required data are loaded from the bulk storage into main memory for faster execution.

While main memory is much faster than bulk memory, accessing main memory tends to be a bottleneck from the perspective of the processor. A typical read cycle, for example, involves the processor asserting an address, selecting memory or other device associated with that address, reception and decoding of the address by the memory, and, finally, access and transmission of the contents at the addressed location to the processor. Such a read operation can consume several processing cycles.

Write operations, in which the processor writes data to memory, can be faster since the processor can transmit the data at the same time the address is transmitted. Thus, while, both read and write operations between a processor and main memory can limit processor throughput, the emphasis herein is on the relatively more time-consuming read operations.

Caches reduce the delays involved in main memory accesses by storing data and instructions likely to be requested by a processor in a relatively small and fast memory. There can be multiple levels of cache, e.g., a smaller, faster, level-one (L1) cache and a larger, slower, level-two (L2) cache. A typical read operation involves transmitting a read request to the L1 cache, the L2 cache, and main memory concurrently. If the requested data is found in the L1 cache, the processor's request is satisfied from the L1 cache and the accesses of the L2 cache and main memory are aborted. If the data is not found in the L1 cache, but is found in the L2-cache, the data is provided by the L2 cache and the access of main memory is aborted. If the requested data is not in either cache, the request is fulfilled by main memory.

An L2 cache typically controls requests by a processor targeted for main memory. The L2 cache typically converts a request for data at a single address location to a request for data at a series of, e.g., four, address locations. The cache stores the requested data along with neighboring data on the assumption that the processor is relatively likely to recall previously requested data or to request data stored near previously requested data.

While the presence of a cache improves the availability of data to the processor, the longer access times associated with the fetching of lines including uncached data limit performance. If a cache controller has to send multiple, e.g., four, addresses, for each line to be cached, the four associated access cycles can be a burden to performance. In particular, there can be an access latency associated with each main memory access so that each line access would involve multiples of such latencies.

Modern "synchronous dynamic random-access memories" (SDRAMs) typically employ two features designed to minimize the compounding of access latencies. The first feature is pipelined processing in which a read request can be received while a previous read request is being processed. With pipelining there is typically a latency of two or more system-bus cycles associated with the first access, but subsequent sequential accesses do not add to that latency beyond a typical baseline of one system-bus cycle per address.

If the system bus is also pipelined, the master (e.g., the processor/cache system) can send four addresses in quick succession and receive the requested data without an inter-request delay. However, many system buses and many processors are not designed take full advantage of memory pipelining. When the bus is not pipelined and often even when it is, a master must wait until one request is fulfilled before issuing the next request.

To take advantage of a pipelined memory despite limitations in the system bus or processor, SDRAMs can provide for multi-address burst modes. In such a mode, an SDRAM provides the contents not only of the requested address but also of succeeding addresses. For example, in a burst-4 mode, an SDRAM provides the data at the requested address and the data at the next three consecutive addresses.

In principle, by setting the burst length equal to the cache line length, a cache could receive a complete line in response to a single address request. However, many systems provide for exceptional circumstances (e.g., a "non-cacheable read" instruction) in which only one address is to be read. If the system cannot tolerate unrequested data on the system bus, then burst-4 mode is problematic. The burst-1 mode avoids this problem, but introduces multi-cycle latencies in single-cache-line fetches.

U.S. Pat. No. 5,802,597 to Nelsen, "Nelsen" herein, discloses a system that provides for single address accesses while a memory is in burst-4 mode. The memory controller forwards the first address to the memory—which then begins the burst. When the data from the first address is received by the master (the processor/cache combination), the second address can be asserted. If the second address is asserted (confirming the corresponding address as generated in the burst), the burst is allowed to continue. If the second address is not asserted (disconfirming the second address as generated in the burst), the burst is aborted.

To effect such an abort, the connection between the memory and the system bus can be broken and the system bus tri-stated. The memory pipeline can be cleared and the memory outputs can be cleared. This abort procedure can consume a cycle or two. Depending on the situation, this abort delay might or might not affect performance. In the worst case, if a write operation I s asserted right after the read operation, the write operation could suffer a latency corresponding to that imposed by the abort. However, this cost can be more than offset where the single-address accesses are infrequent relative to the four-address accesses.

The optimal burst length depends on the master. For example, the optimal burst length can be four for a master with a four-word-wide cache, while the optimal burst length can be eight for a master with an eight-word-wide cache. Systems with multiple masters having different optimal burst lengths can provide for changing the burst mode to match the current master.

Typically, changing the burst mode involves executing a write instruction, e.g., part of a driver program or subroutine, to write a burst value in a burst-mode register of the SDRAM memory. Thus, changing the burst mode can involve calling a subroutine as well as executing the included burst-value write instruction. A burst mode switch can consume several bus cycles. If masters are changed infrequently, the associated latency can be negligible when averaged over time. However, in modern systems in which multiple masters are rapidly time-multiplexed to simulate concurrency, the latencies involved in changing burst modes can be significant.

If the burst mode is not changed when a different master is selected, then memory accesses can be non-optimal for at least one of the masters. If the burst length is too short, multiple bursts are required and inter-burst latencies are incurred. If the burst length is too long, abort latencies are incurred on a regular basis. Thus, depending on the implementation, a multi-master system with a non-pipelined bus incurs penalties due to 1) burst mode changes, 2) interburst latencies, and/or 3) abort latencies. What is needed is a system in which such latencies are further reduced.

SUMMARY OF THE INVENTION

The present invention provides for automated burst-mode changes to minimize latencies due to changes in burst mode. Information regarding the preferred burst mode for each system bus master can be stored, e.g., in a look-up table. The master-grant signal used to select the current master can be used to select the burst mode preferred for the selected master.

Since standard memory modules are not provided with programmable burst-mode tables or with means for detecting master-grant signals, the present invention provides for these capabilities to be built into a memory controller. The controller assumes the burst-mode function for the memory system by generating the required addresses at a rate designed to keep the memory pipeline full. In this case, the burst mode of the memory system changes, even though the burst mode of the memory itself does not.

For example, the memory controller can respond to a master with a four-word-wide cache by generating and transmitting to memory three successor addresses after the requested address is forwarded to memory in burst-1 mode. When bus control is switched to a master with an eight-word-wide cache, the memory controller follows the requested address with seven successor addresses generated by the controller.

If the memory is in burst-1 mode, an address is sent from the controller to the memory every bus cycle. To reduce power consumption, the memory can be put in a multiple-address burst mode. For example, if the memory is in burst-4 mode, the memory controller can generate and transmit every fourth address every fourth cycle. In the case of the master with a four-word-wide cache, only the requested address is forwarded; the remaining three addresses are automatically generated by the memory. In the case of the master with an eight-word-wide cache, one successor address (equal to the original request plus four) is generated and transmitted four cycles after the requested address is forwarded to the memory.

In general, the preferred burst mode would correspond to the largest common factor of the cache widths of the available masters. Special cases involve streaming masters, masters with variable preferred burst lengths, and infrequently used masters preferring short burst lengths. In each of these cases, the memory burst length selection involves tradeoffs—however, the tradeoffs are generally less costly than operation without the invention would be.

The invention thus provides that the memory-system burst length can be any integer multiple of the fixed memory burst length. In one realization, the memory controller is programmed with the memory burst length. Each master is then assigned a multiple of that burst length. When a newly selected master issues a read that is to be satisfied from main memory, the multiplier is the number of consecutive memory bursts constituting the system-memory burst.

To this end, the controller can include two counters. One counter is a memory-burst counter and mirrors the burst activity in the memory. The second counter is the multiplier counter, which is clocked by the burst counter. The multiplier counter counts the number of bursts as they are generated. When the number of memory bursts equals the multiplier number, the controller halts the bursting. If at any time during the series of bursts, an address speculatively generated is not confirmed, the bursting is aborted.

The present invention permits memory-system burst mode changes with minimal or negligible latency penalties. Even though the burst mode of the memory itself is not changed, inter-burst latencies are avoided for masters preferring bursts longer than the set memory burst length. Thus, performance in multi-master systems using a non-pipelined bus can be enhanced. By optimally selecting the burst mode, power requirements can be minimized.

The inventive approach is preferable to utilizing long bursts that must be aborted frequently. Typically, when a write operation follows a burst, the invention allows the burst to be completed before termination. Thus avoided are latencies involved in clearing an aborted burst before a write operation can be executed. These and other features and advantages of the invention are apparent from the description below with reference to the following drawings.

DESCRIPTION OF THE PREFERRED EMBODIMENTS

Figure 1:
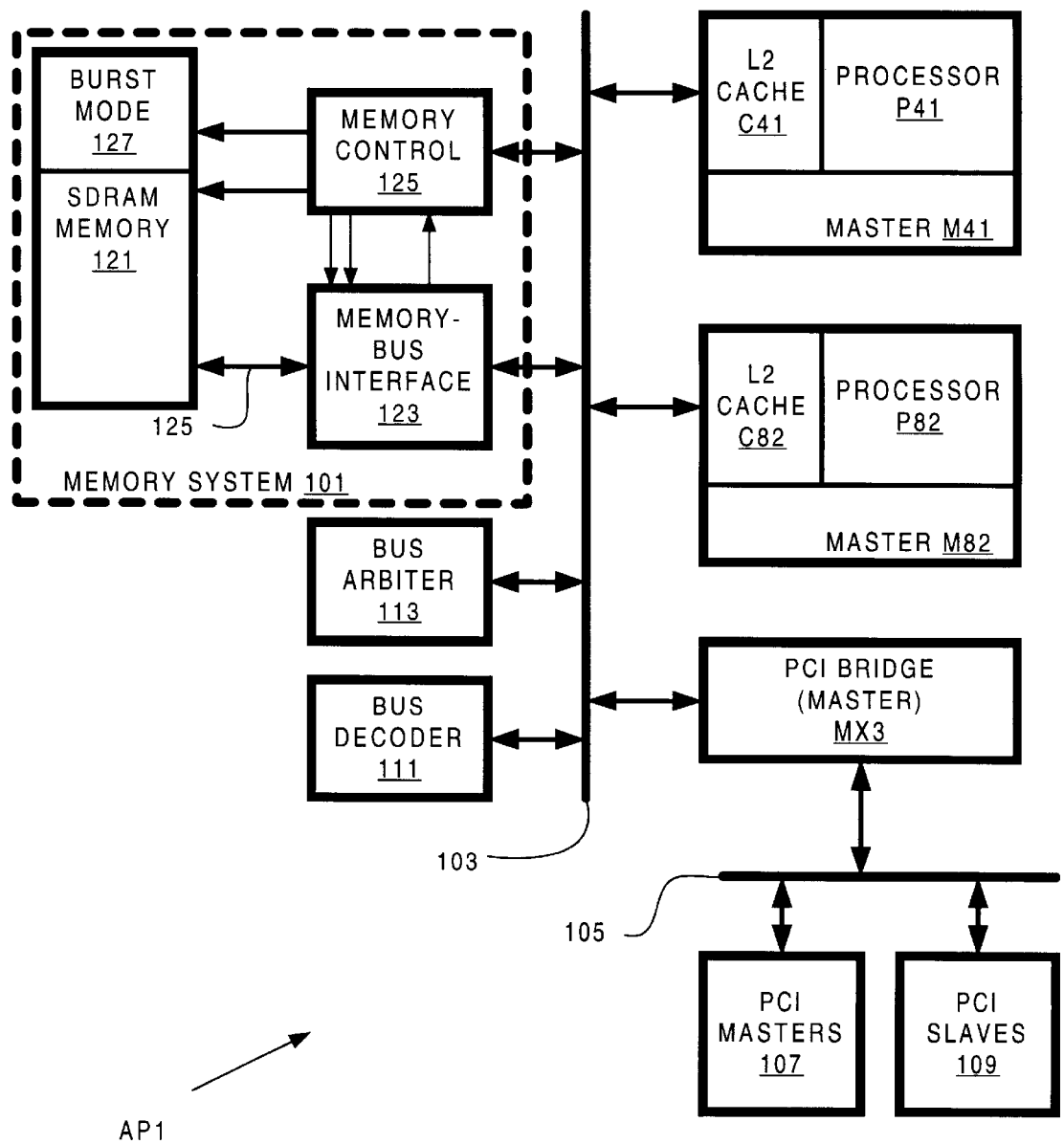
FIG. 1 is a block diagram of a computer system including a memory controller incorporating the present invention.

In accordance with the present invention, a computer system AP1 comprises three bus masters M41, M82, and MX3 coupled to a memory system 101 via a system bus 103. Bus master M41 comprises a first data processor P41 and an associated L2 cache C41. Bus master M82 comprises a second data processor P82 and an associated L2 cache C82. Bus master MX3 is a PCI bridge that couples system bus 103 to a PCI bus 105. PCI bus 105 hosts both PCI masters 107 and PCI slaves 109. A bus decoder 111 decodes addresses asserted on system bus 103 so that addressed devices can be selected. A bus arbiter 113 determines which master among M41, M82, and MX3, has control of system bus 103 at any given time.

Memory system 101 includes SDRAM memory 121, which can be arranged in several modules, a memory-bus interface 123, and an memory controller 125. Interface 123 controllably couples memory 121 to system bus 103 to allow addresses to be transferred to memory 121 and data to be written to and read from memory 121. Interface 123 is controlled by memory controller 125.

Memory controller 125 is coupled to system bus 103 for detecting when memory 121 is selected as the target of an address. Controller 125 also examines grant signals placed on system bus 103 by bus arbiter 113 to determine which master is being granted control of system bus 103. Controller 125 is coupled to memory 121 for programming a burst-mode register 127 thereof to determine the burst mode of memory 121. The available burst modes are burst-one, burst-four, burst-eight, and burst page (256).

Controller 125 is coupled to interface 123 to receive addresses therefrom as asserted on system bus 103. Controller 125 can generate addresses and transmit them to memory 121 via interface 123. Controller 125 is also coupled to interface 123 so that controller 125 can gate memory 121 from system bus 103 to prevent data that memory 121 is driving from reaching system bus 103.

Figure 2:
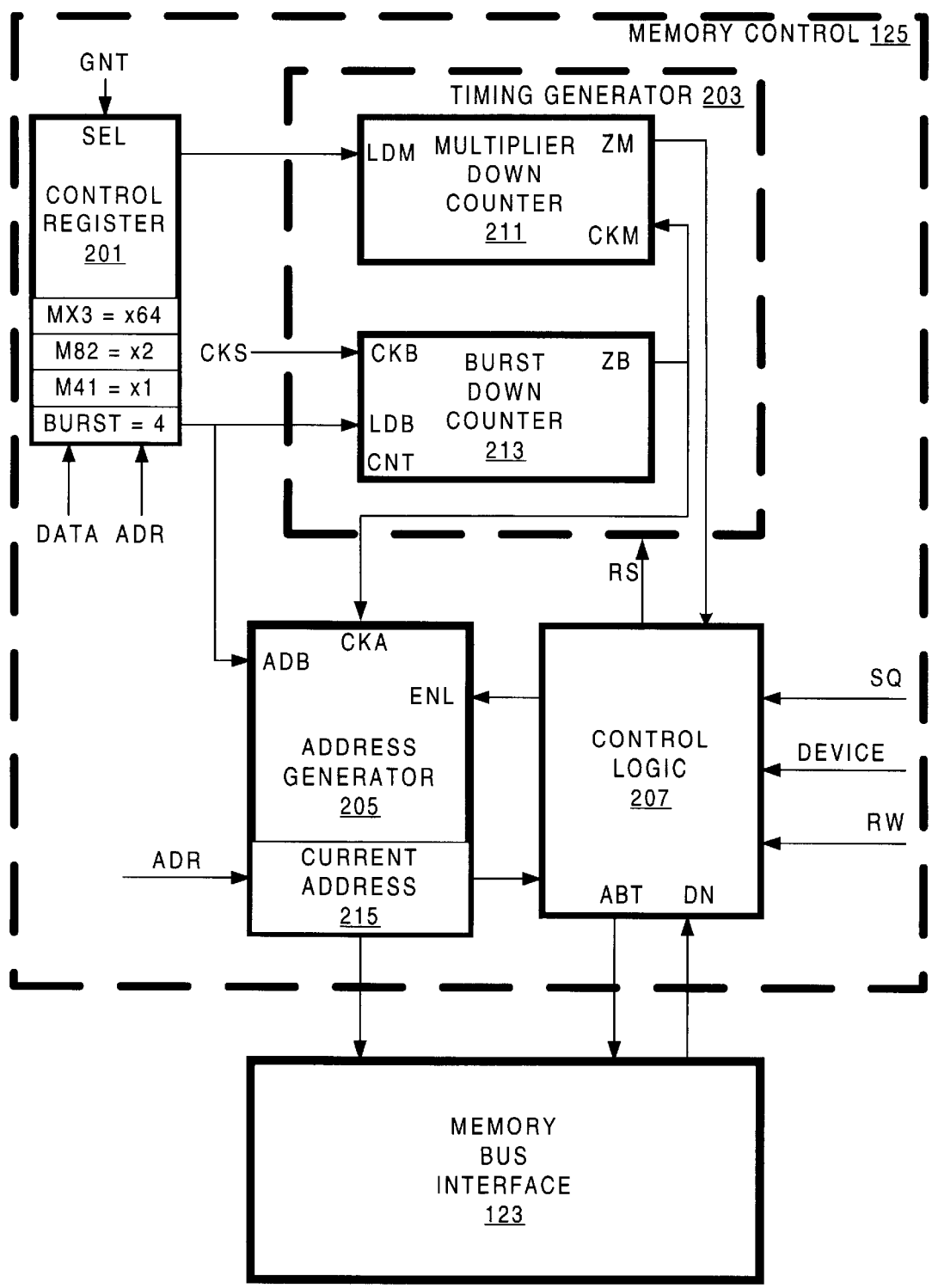
FIG. 2 is a block diagram of the memory controller shown in FIG. 1.

As shown in FIG. 2, controller 125 comprises a control register bank 201, a timing generator 203, and address generator 205, and control logic 207. Timing generator 203 includes a "burst" down counter 213 and a "multiplier" down counter 211 in a cascaded relationship. FIG. 2 shows communications paths between controller 125 and memory-bus interface 123. Other inputs (GNT, DATA, ADR, SQ, DEVICE, RW) shown in FIG. 2 to controller 125 are from system bus 103 of FIG. 1.

Figure 3:
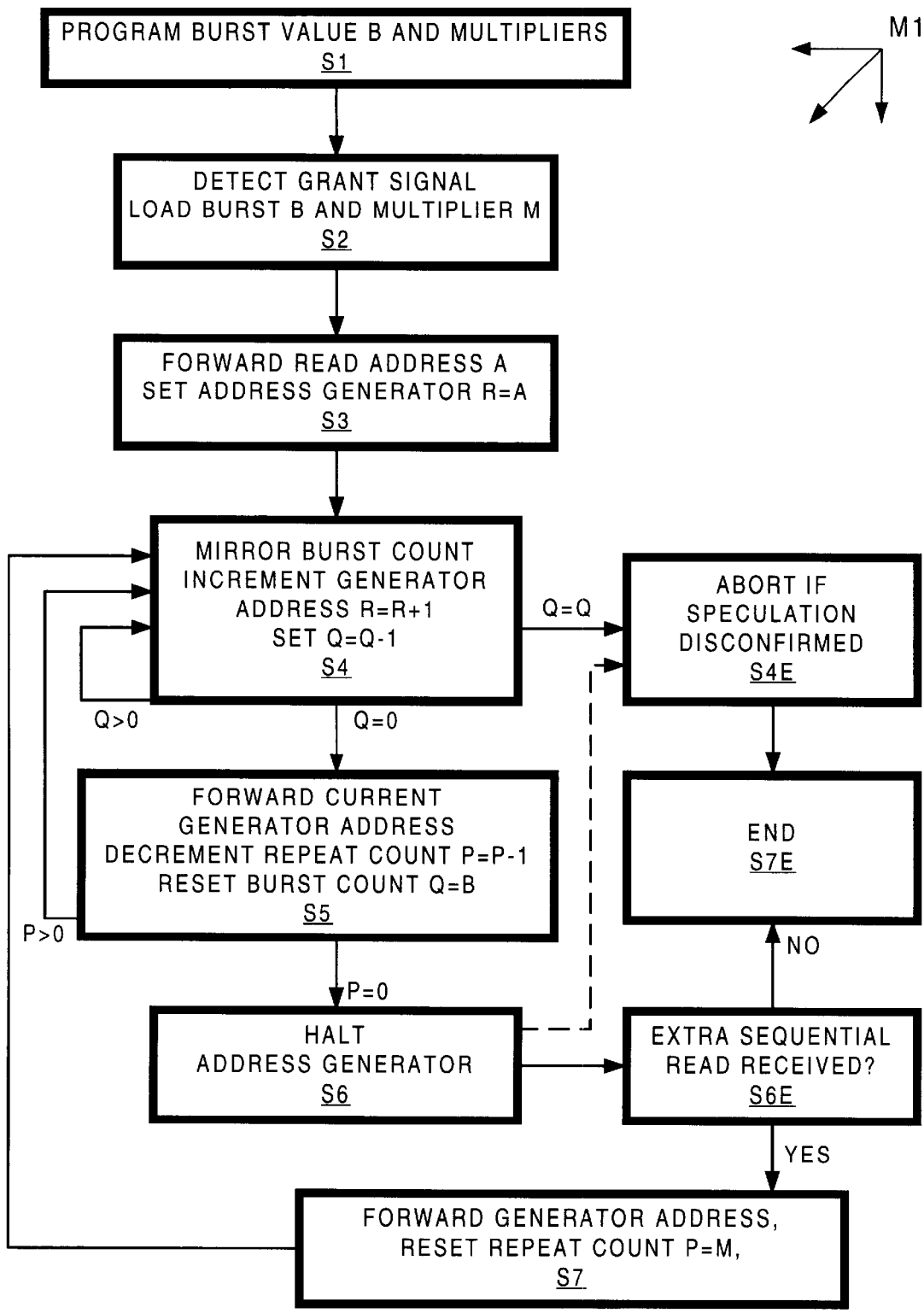
FIG. 3 is a flow chart of a method in accordance with the present invention implemented in the memory controller of FIG. 2.

A method M1 implemented by controller 125 is flow charted in FIG. 3. Step S1 involves programming control register bank 201 with multipliers for respective bus masters M41, M82, and MX3, and a common burst factor. In step S2, controller 125 detects a grant signal designed to select the current master. Controller 125 loads the multiplier into multiplier counter 211 and the burst value into burst counter 213. At step S3, controller 125 forwards a read address received from the current master to memory 121.

Step S4 involves mirroring the memory burst count. The address represented in address generator 205 is incremented each clock cycle while the burst count in burst counter 213 is decremented. Step S4 is iterated until the burst count reaches zero. When zero is reached, method M1 proceeds to step S5.

Step S4E is a monitoring step that occurs in parallel with step S4 but with a 3-step delay equal to the length of the memory pipeline. If an expected sequential read signal does not follow within an appropriate time after control logic 207 receives a done signal DN (indicating that data at the previous address was transmitted to the current master), the read access is aborted and the memory pipeline cleared at step S4E.

Step S5 involves forwarding the address currently stored in address generator 205 to memory 121 to begin the next burst. The repeat count is decremented and the burst count is reset. If the repeat count remains positive after being decremented, method M1 returns to step S4.

When the repeat count reaches Zero, address generation is halted at step S6. However, memory 121 continues to process its pipeline. Once the pipeline is cleared, controller 125 checks for a sequential read from system bus 103 at step S7E. If, as expected, there is no sequential read called for, method M1 ends at step S6E. On the other hand, if a sequential read is received, the address stored in address generator 205 is forward to memory 121, the repeat count is reset to the multiplier M, and method M1 returns to step S4.

Since L2 cache C41 is four-words wide, the preferred burst-mode for master M41 is burst-4. L2 cache C82 is eight-words wide so the preferred burst mode for master M82 is burst-8. Master MX3 is a PCI interface and the preferred burst mode would depend on the characteristics of any dominant master on PCI bus 105. In the example below, it is assumed that the dominant PCI bus master is a disk controller that typically streams when reading data. In that case, a maximum burst mode, e.g., page burst mode, is appropriate.

In this case, four is the largest common factor among the burst modes (4, 8, and page) optimal for respective masters. This largest common factor is selected as the actual burst mode for memory 121. Correspondingly, the burst mode register of controller register bank 201 is set to four (B=4).

The multiple for master M41 is its desired burst mode (4) for that master divided by the actual memory burst mode (4). In this case, the desired and actual are equal so that the quotient is one. Thus, one is stored in the register of bank 201 corresponding to master M41.

The quotient for master M82 is two, so two is stored in the register of bank 201 corresponding to master M82. The quotient for master MX3 is the page size, 256 words divided by the actual burst size; in this case, the quotient is 64, which is the value stored in the register of bank 201 corresponding to master MX3. Step S1 of method M1 involves programming these values into bank 201 using the connected data and address lines.

At step S2, controller 125 detects a grant signal from bus arbiter 113 selecting a new current master for bus 103. Controller 125 uses this signal to select the multiplier corresponding to the newly selected master. In this example, the selected master is M82, so that two is loaded into multiplier counter 211 and four is loaded into burst counter 213.

At step S3, master M82 initiates a read operation directed at main memory. The address is decoded by bus decoder 111, which selects memory system 101 the target of the read. Control logic 207 of memory controller 125 receives the device selection signal. It also receives an indication along line RW that a read operation is being requested. The requested address is forwarded to memory 121, while a copy is entered into current address register 215 of address generator 205.

Since memory 121 is in burst-4 mode, it successively accesses the contents of the addressed memory location and its three immediate successors in a pipelined manner. Address generator 205 is essentially an upcounter which increments the stored address once each system clock cycle. Concurrently, the burst counter is decrementing its stored value of four each clock cycle.

When the burst count falls to three, memory 121 generates its first successor address; this address is mirrored in address generator 205. When the burst count falls to two, memory 121 generates its second successor address, which is also mirrored in address generator 205.

When the burst count falls to one, memory 121 generates its final successor address of its burst; this address is mirrored by address generator 205. In this same cycle, the data stored in the memory location associated with the original address received from master M82 is placed on system bus 103. Interface 123 indicates that the data is available by issuing a done DN signal to control logic 207.

In this same bus cycle that the data from the first memory location is transmitted, master M82 asserts a sequential read indication that is received by control logic 207. If, for example, in the case that processor P82 issued a non-cacheable read request, there were no sequential read signal in this cycle, control logic 207 would issue an abort, as indicated at step S4E. This abort is directed to memory bus interface 123 so that it tri-states its interface with system bus 103 before data from the second memory location of memory 121 is made available. The abort signal is passed onto memory 121, which responds by clearing its pipeline and dissipating the drive signal that was to be applied to the second word of data. Note that the abortion procedure of step S4E applies to any of the successor addresses speculatively generated but not ratified by a subsequent sequential read signal.

Assuming the first sequential read signal is received, method M1 continues by iterating step S4. In this case, the burst count falls to zero. The second data word is transmitted to master M82, which responds by issuing another sequential read signal. Address generator 205 increments to the original address plus four. This address is the first address not generated by memory 121 in its first burst cycle.

Since the burst count is zero, method M1 proceeds to step S5. The repeat count is decremented from its original two to one. The burst count is reset to four. The current address of address generator 205 is forwarded to memory 121, which begins a second burst cycle. Method M1 returns to step S4. Note that there are no system bus cycles wasted between the end of the first burst and the beginning of the second.

After the second burst runs its course, method M1 returns to Step S5. In this case, the repeat counter is decremented from one to zero. Instead of returning to step S4 for another burst, address generator 205 is halted by control logic 207 at step S6. Due to the pipelining of memory 121, three sequential read indications are still anticipated. If they are not detected, an abort is issued in accordance with step S4E. This contingency is indicated by the dashed arrow in FIG. 3.

Once the pipeline is clear, all speculative addresses have been ratified. In general, no sequential address indication is anticipated after the last word of data is transmitted to master M82. If in fact, no such sequential address indication is received, then method M1 ends at step S7E.

However, if an extra sequential read is received, method M1 continues with step S7. In this case, the address stored in address generator 205 is forwarded to memory 121. The repeated count is reset to two, initiating another two-burst cycle of speculative addressing. In this case, a 3-cycle inter-burst latency would be incurred.

If instead of a sequential read, master M82 issues a new address plus a non-sequential read, method M1 would restart. A four-cycle inter-burst latency would be incurred. The extra cycle relative to a sequential read is due to an extra device selection cycle incurred when a new address is asserted by a master.

If instead of a read, master M82 issues a sequential write, no latency is incurred even though the write operation is not pipelined. If the write is non-sequential, a one-cycle latency is incurred due to device selection. This is a big improvement over writes following an abort in which at least two cycles of latency are incurred for clearing the memory pipeline and sinking the unwanted data being driven by memory 121.

In the event the read by master M82 is followed by a write by another master, there would be a one-cycle latency associated with the change of grant. There would still be a one-cycle disadvantage due to an aborted read relative to a non-aborted read.

It is an important feature of the invention that when the master is changed, the memory system burst mode is changed but the burst mode of the memory itself is not changed. Thus, if the master is switched form M82 to M41, the memory burst mode remains at four. Because the memory burst mode is not changed, no latency due to changing burst mode is incurred. No latency is involved in changing the memory-system burst mode since that simply involves selecting a new multiplier during the same bus cycle that the new master is selected.

In an alternative embodiment, the memory burst mode is set to one. In this case, the controller transmits a new address every bus cycle. This embodiment provides the same latency reductions as the embodiment detailed above. However, more power is consumed due to the increased address traffic between the memory controller and the memory itself. Likewise, other small burst modes, e.g., two, could be used with the only penalty being power consumption. The invention also provides for the use of larger burst modes. In that case, more abortions would be issued and the associated latencies would be incurred more often.

The illustrated embodiment employs SDRAM, but other embodiments utilize other forms of synchronous pipelined memory. While the illustrated embodiments show the invention practiced in the context of the memory controller, in other embodiments using nonstandard memory designs, the memory itself includes the programmable burst table and the detector of the master grant signal. Other modifications to and variations upon the described embodiments are provided for by the present invention, the scope of which is defined by the following claims.

What is claimed is:

1. A memory controller comprising:
    a first register to store a burst value B corresponding to a first number of synchronous memory accesses of a burst mode of a memory;
    a second register to store a burst multiple M, said burst multiple M having a value such that a multiplication product with the burst value B is equal to a second number of synchronous memory accesses of a burst mode of a master; and
    an address generator to capture a first address of a memory access initiated by the master, said address generator to provide a number of successive addresses to the memory equal to the burst multiple M−1, each successive address being equal to a previous address plus the burst value B.

2. The memory controller of claim 1 wherein the burst multiple M comprises a first burst multiple M1 and the master comprises a first master, the memory controller further comprising:
    a third register to store a second burst multiple M2 that is different from the first burst multiple M1, said second burst multiple M2 having a value such that a multiplication product with the burst value B is equal to a third number of synchronous memory accesses of a burst mode of a second master;

said burst value B comprising a common denominator of the burst modes of the first master and the second master; and said address generator to capture a first address of a memory access initiated by the second master, said address generator to provide a number of successive addresses to the memory equal to the second burst multiple M2−1, each successive address being equal to a previous address plus the burst value B.

3. The memory controller of claim 2 wherein the common denominator is a largest common denominator.

4. The memory controller of claim 2 further comprising:

control logic to detect which of the first master and the second master initiates a particular memory access and to select the first burst multiple M1 from the second register or the second burst multiple M2 from the third register for use by the address generator accordingly.

5. The memory controller of claim 1 further comprising:

a first counter to count a number of memory accesses and to indicate when the number of memory accesses equals the burst value; and a second counter to count a number of addresses provided to the memory and to indicate when the number of addresses equals the burst multiple M.

6. The memory controller of claim 5 wherein said address generator provides a new successive address and the first counter is reset when the first counter indicates the number of memory accesses equals the burst value.

7. The memory controller of claim 5 wherein said address generator stops providing successive addresses and the second counter is reset when the second counter indicates the number of addresses equals the burst multiple M.

8. The memory controller of claim 1 further comprising:

control logic to halt the address generator if the master has not initiated a burst operation.

9. A memory controller comprising:

a first register to store a burst value corresponding to a first number of synchronous memory accesses of a burst mode of a memory;

a plurality of additional registers to store a plurality of burst multiples, each having a value such that multiplication products with the burst value are equal to respective numbers of synchronous memory accesses of a plurality of burst modes of a plurality of masters, said burst value being equal to a common denominator of the plurality of burst modes; and an address generator to capture a first address of a memory access initiated by one of the plurality of masters, said address generator to provide a number of successive addresses to the memory equal to the respective burst multiple minus one, each successive address being equal to a previous address plus the burst value.

10. A method comprising:

capturing a first address of a memory access initiated by a master to a memory; and providing a number of successive addresses to the memory equal to a burst multiple minus one, each successive address being equal to a previous address plus a burst value, said burst value corresponding to a first number of synchronous memory accesses of a burst mode of the memory, and said burst multiple having a value such that a multiplication product with the burst value is equal to a second number of synchronous memory addresses of a burst mode of the master.

11. The method of claim 10 wherein the master is one of a plurality of masters and the burst multiple is one of a plurality of burst multiples, each of the plurality of burst multiples corresponding to one of the plurality of masters, the method further comprising:

selecting the burst multiple from the plurality of burst multiples based on which of the plurality of masters initiated the memory access.

12. The method of claim 10 further comprising:

programming the memory with the burst value; and storing the burst value and the burst multiple for use in generating the successive addresses.

13. The method of claim 10 further comprising:

halting successive addresses if the master has not initiated a burst operation.

14. The method of claim 10 further comprising:

providing a second number of successive addresses to the memory equal to the burst multiple if the master initiates an additional memory access having a first address equal to a last previous address plus the burst value, each said second number of successive addresses being equal to a previous address plus the burst value.

* * * * *